Patented May 12, 1942

2,282,371

UNITED STATES PATENT OFFICE 2,282,371

COATED SHEET MATERIALS

John Heron McGill, Manchester, England, and Harold James Tattersall, Ardrossan, Scotland, assignors to Imperial Chemical Industries Limited, a corporation of Great Britain No Drawing. Application June 7, 1939, Serial No. 277,786. In Great Britain June 13, 1938

3 Claims. (Cl. 117—73)

This invention relates to a process for the production of lacquer or like coatings on sheet materials. The invention relates in particular to a process for the application of a cellulose derivative lacquer, e. g. a nitrocellulose lacquer, to a textile or other flexible fibrous base material that has been impregnated and/or coated with a rubber or rubber-containing composition. The invention also relates to the application of such laquers to rubber or rubberised surfaces or the like, for example to the surfaces of solid materials consisting of or comprising guttapercha, balata, and other rubber-like natural gums.

Cellulose derivative lacquer coatings, particularly nitrocellulose coatings, do not adhere well to rubber or rubberised surfaces, and numerous attempts have been made to improve their adhesion thereto. According to one proposal, the rubber or rubberised surface is given an intermediate coating comprising rubber latex and one or more partly or wholly polymerised unsaturated organic compounds. According to another proposal, at least one priming coating of a highly-filled rubber dispersion is applied to a base fabric, followed by two or more intermediate coatings containing both rubber and a film-forming substance miscible with rubber and adherent to cellulose lacquer, and finally by a coating of cellulose lacquer; the successive intermediate coatings being of such composition as to provide a gradual transition from the composition of the priming coat or coats to that of the lacquer.

This invention has as an object to devise a new method whereby a surface of rubber containing material can be coated with a cellulose derivative lacquer. A further object is to devise such a method which will be both simpler than previous known methods and will give a better bond between the lacquer and the surface. A still further object is to provide new cellulose lacquered rubber containing articles. A still further object is to provide new cellulose lacquered rubberised fabrics. Further objects will appear hereinafter. These objects are accomplished by the following invention.

We have found that good adhesion between a rubberised surface and a cellulose derivative lacquer is obtained, in some cases to a degree not attainable by any of the known processes, where an intermediate bonding layer is used consisting of or comprising polyvinyl phthalate.

According to the present invention, a process for the production of lacquered surfaces consists in applying to a rubber or rubberised base material a bonding layer consisting of or comprising polyvinyl phthalate, and there after applying a nitrocellulose lacquer. Rubber sheet or rubberised paper or rubberised textile base materials may be employed. Rubber and rubberised surfaces vary considerably in their adhesion properties; and where, on account of heavy vulcanisation, presence of insufficient filling material, or of fillers of a repellent nature, or for any other reason, the rubber or rubberised surface is of a poorly adherent nature, it may be provided with a priming coating of a more adherent nature, for instance a coating of a highly-filled rubber latex or vulcanised rubber composition, or a thin unvulcanised coating produced from a rubber solution or rubber latex, with or without mineral fillers such as china clay, whiting or barytes. A vulcanisation treatment may then be given if desired.

The polyvinyl phthalate may be applied in solution in a volatile organic solvent, preferably one that does not perceptibly attack and swell the underlying rubber surface during the usual drying process. Examples of suitable solvents are benzene, toluene, acetone or mixtures of benzene or toluene with alcohol. More than one coating of polyvinyl phthalate may be used; and each or any coating may, if desired, be baked after drying.

If desired, the polyvinyl phthalate may be applied in association with suitable softening agents, for example camphor or dibutyl phthalate. We prefer, however, to use the normal phthalate of the monomethyl ether of ethylene glycol which is especially adapted for use as a softener with coatings applied to a rubber surface. The best results are obtained when using from 10%–15% of the phthalate of the monomethyl ether of ethylene glycol on the dry weight of the polyvinyl phthalate.

The final cellulose derivative lacquer applied is preferably a nitrocellulose lacquer, and may be applied by spray, brush, roller, knife or any of the usual methods of coating flexible fabrics.

The coated products may be used in upholstery and furnishing, and in the manufacture of belting, fancy goods, and articles of clothing.

The following examples illustrate the process of the invention.

Example 1

A calendered sheet of heat-cured rubber is given a coat of a 5–10% solution of rubber in toluene. When the coating has dried to a tacky consistency, a coating is applied of a 20% solution of polyvinyl phthalate in toluene. The coated material when dry is then finished with a nitrocellulose lacquer.

Example 2

A calendered rubber sheet is treated as described in Example 1, except that the polyvinyl phthalate solution contains 10% of the phthalate of the monomethyl ether of ethylene glycol on the weight of polyvinyl phthalate.

Example 3

A rubberised textile fabric coated with a self-curing rubber mass is given a coating of a polyvinyl phthalate solution as in Example 1, and dried. This step is repeated if necessary to build up any desired thickness of interlayer. The fabric is finally lacquered with a nitrocellulose composition.

Example 4

A rubberised textile fabric is treated as described in Example 3, except that the polyvinyl phthalate solution contains 15% of the phthalate of the monomethyl ether of ethylene glycol on the weight of polyvinyl phthalate.

Example 5

A coating of a polyvinyl phthalate solution is applied to a web of latex-impregnated paper in a paper coating machine. The coated and dried paper is then coated with a nitrocellulose composition.

As many apparently widely different embodiments of this invention may be made without departing from the spirit and scope thereof, it is to be understood that the invention is not limited to the specific embodiments thereof except as defined in the appended claims.

We claim:

1. The process comprising applying a composition containing a polyvinyl phthalate and from 10 to 15% thereof of a phthalate of the monomethyl ether of ethylene glycol as a plasticizer to a rubberized fabric base, and subsequently applying a nitrocellulose lacquer thereto.

2. The process of coating fabrics which comprises applying to a rubberized fabric base a 5 to 10% dispersion of rubber, applying a coating comprising polyvinyl phthalate and as a plasticizer a phthalate of the monomethyl ether of ethylene glycol, and thereafter applying a cellulose derivative surface coat.

3. The combination comprising a rubberized fabric base, an intermediate film of polyvinyl phthalate and from 10 to 15% thereof of a phthalate of the monomethyl ether of ethylene glycol and a surface film containing nitrocellulose.

JOHN HERON McGILL.
HAROLD JAMES TATTERSALL.